(12) United States Patent
Antonevich (10) Patent No.: US 11,449,353 B2
(45) Date of Patent: Sep. 20, 2022

(54) SYSTEM AND METHOD FOR PROPRIETARY SOURCE CODE INTERPRETATION

(71) Applicant: Next Pathway Inc., Toronto (CA)

(72) Inventor: Vladimir Antonevich, Toronto (CA)

(73) Assignee: Next Pathway Inc., Toronto (CA)

( * ) Notice: Subject to any disclaimer, the term of this patent is extended or adjusted under 35 U.S.C. 154(b) by 0 days.

(21) Appl. No.: 17/181,164

(22) Filed: Feb. 22, 2021

(65) Prior Publication Data

US 2021/0263756 A1 Aug. 26, 2021

Related U.S. Application Data

(60) Provisional application No. 62/981,153, filed on Feb. 25, 2020.

(51) Int. Cl.
*G06F 9/45* (2006.01)
*G06F 9/455* (2018.01)

(52) U.S. Cl.
CPC .................. *G06F 9/4552* (2013.01)

(58) Field of Classification Search
CPC . G06F 9/4552; G06F 9/45516; G06F 9/45525
USPC ........................................................ 717/139
See application file for complete search history.

(56) References Cited

U.S. PATENT DOCUMENTS

| 7,277,835 | B2* | 10/2007 | Spitz | G06T 17/10 |
| | | | | 703/2 |
| 2003/0188036 | A1* | 10/2003 | Chen | G06F 9/4856 |
| | | | | 719/310 |
| 2004/0064521 | A1* | 4/2004 | Baudry | G06F 9/45537 |
| | | | | 709/213 |
| 2007/0039018 | A1* | 2/2007 | Saslow | G06Q 30/02 |
| | | | | 725/22 |

(Continued)

OTHER PUBLICATIONS

Title: Source code generator based on a proprietary specification language; author: K Fertalj; published on 2002.*

(Continued)

*Primary Examiner* — Chameli Das
(74) *Attorney, Agent, or Firm* — Kilpatrick Townsend & Stockton LLP (57) ABSTRACT

A system and method for interpreting source code in a source language executable in a source computing system for use in to a target computing system that is incompatible with the source computing system. The source code in the source language is parsed to identify a proprietary statement. The proprietary statement is specific to the source computing system and incompatible with the target computing system. A corresponding operational pipeline is selected for the identified proprietary statement; the pipeline specifies at least one command that is executable by a processor in the target computing system. The at least one command is transmitted to the processor in the target computing environment for execution. Execution of the of the at least one command by the processor causes the target computing (Continued)

system to perform corresponding computing tasks to obtain computing results that are equivalent to results obtainable by the source computing system executing the proprietary statement.

6 Claims, 12 Drawing Sheets

(56) References Cited

U.S. PATENT DOCUMENTS

| | | | | |
|---|---|---|---|---|
| 2012/0042314 | A1* | 2/2012 | Aydin | G06F 9/45558 |
| | | | | 718/101 |
| 2012/0266228 | A1* | 10/2012 | Dash | G06F 21/41 |
| | | | | 726/8 |
| 2017/0262498 | A1* | 9/2017 | Kennedy | G06F 16/2448 |
| 2018/0059965 | A1* | 3/2018 | Goodman | G06F 3/0619 |
| 2021/0233389 | A1* | 7/2021 | Kim | H05B 47/12 |

OTHER PUBLICATIONS

Title: A comparison between select open source and proprietary integrated library systems, author: J Pruett,, publishedon 2013.*
Title: The openinterface framework: A tool for multimodal interaction author: MSerrano et al, published on 2008.*
Title: Constructing distributed systems in Conic; author: J Magee, published on 1989.*

* cited by examiner

```
.SESSIONS ${FL_SESS}
.LOGON ${USERID},${PASSWORD}${ACCTSTR_PROM}

.SET RECORD VARTEXT "|"

BEGIN LOADING   ${DWH_STAGE_DB}.r_${scriptID}_cpn_${promoSubGrpCd}
    ERRORFILES  ${DWH_STAGE_DB}.r_${scriptID}_cpn_${promoSubGrpCd}_e1,
                ${DWH_STAGE_DB}.r_${scriptID}_cpn_${promoSubGrpCd}_e2
    CHECKPOINT 9999999999;

DEFINE
 ...
FILE=${TransPath}/promo_cpn.${PromoSubGrpCd}.unl;

INSERT INTO     ${DWH_STAGE_DB}.r_${scriptID}_cpn_${promoSubGrpCd}.
 ...
.END LOADING
.LOGOFF
 ...
echo "\n****END    : LoadCPN - `date` ****\n"
}
```

302 — (braces SESSIONS through CHECKPOINT)
306 — (brace FILE line)
304 — (brace INSERT INTO line)
308 — (brace END LOADING / LOGOFF)

SYSTEM AND METHOD FOR PROPRIETARY SOURCE CODE INTERPRETATION

CROSS-REFERENCE TO RELATED APPLICATIONS

This application claims priority to U.S. Provisional Patent Application No. 62/981,153, filed Feb. 25, 2020, the disclosure of which is incorporated by reference herein in its entirety.

TECHNICAL FIELD

The present disclosure relates generally to automated source code processing, and more specifically to a method and system to interpret source code written in a source language containing calls to proprietary methods and functions for execution in a target computing environment configured to execute source code coded in a target language.

BACKGROUND

Advancements in cloud-based technologies have enabled the establishment of highly versatile and scalable computing systems. Such systems are appealing to enterprise users who desire to maintain and operate their corporate and enterprise data systems within distributed computing environments. As such, it is desirable to migrate existing data sets and related applications residing within legacy, and often on-premises and proprietary, data systems to a cloud-based enterprise data lake or a cloud-based data platform to take advantage of the versatility and scalability of distributed computing systems.

The task of moving data from one data system to another data system such as a cloud-based enterprise data lake or cloud-based data platform involves moving the data as well as the corresponding data applications and processes that have been developed to manage and analyze the data. The task of migrating the applications and processes may pose a challenge because it generally requires translating the corresponding source code written in a source programming language intended for execution by the source data system into source code in a target programming language that can be executed by the target data system. Source code used with the source system can further incorporate statements that invoke proprietary functions or utilities that are built and optimized specifically for such systems. There is often no corresponding counterpart functions or utilities in the target data system. One solution to the foregoing problem is to manually develop code covering these proprietary functions or utilities that are executable by the target system to obtain equivalent results. However, such a task can be complex, resource intensive (i.e. costly), time-consuming and error-prone.

Accordingly, in view of the foregoing deficiencies, there is a need for a system and method to handle source code statements that invoke proprietary functions or utilities intended for the source data system to enable deployment of equivalent computing results or functionalities in the target data system.

SUMMARY OF THE DISCLOSURE

In general, the present specification describes a system and method for run-time interpretation of source code for a source system containing calls to proprietary functions and utilities for execution in a target system in a target computing environment using system features of the target system.

According to a first broad aspect of the invention, there is provided a computer-implemented method to interpret source code corresponding to a source language that is executable in a source computing system for use in a target computing system, the method comprising: parsing the source code to identify a proprietary statement, the proprietary statement being specific to the source computing system and incompatible with the target computing system; selecting, for the proprietary statement, a corresponding operational pipeline, the operational pipeline specifying at least one command, all of which are executable by the target computing system; and transmitting the at least one command to the target computing system for execution, wherein execution of the of the at least one command causes the target computing system to perform computing tasks that correspond to respective computing tasks performed by the source computing system when executing the proprietary statement.

According to a second broad aspect of the invention, there is provided a source code interpreter system in a target computing system for interpreting source code corresponding to a source language that is executable in a source computing system, the source code interpreter system comprising: a source file parser for parsing the source code to identify a proprietary statement, the proprietary statement being specific to the source computing system and incompatible with the target computing system; an operational pipeline selector for selecting a corresponding operational pipeline for the proprietary statement, the operational pipeline specifying at least one command, all of which are executable by the target computing system; and a command generator for transmitting the at least one command to the target computing system for execution, wherein execution of the at least one command causes the target computing system to perform computing tasks that correspond to respective computing tasks performed by the source computing system when executing the proprietary statement.

BRIEF DESCRIPTION OF THE DRAWINGS

Features and advantages of the embodiments of the present invention will become apparent from the following detailed description, taken with reference to the appended drawings in which.

DETAILED DESCRIPTION

The description that follows, and the embodiments described therein, are provided by way of illustration of examples of particular embodiments of the principles of the present invention. These examples are provided for the purposes of explanation, and not limitation, of those principles and operation of the invention.

Legacy data solutions are tightly integrated into critical business processes. For example, businesses and enterprises often develop many custom reporting or process applications (e.g. in the form of SQL, scripts, stored procedures and application code) to manage the data stored within their existing (i.e. legacy) data warehouses to support their business operations. It is often difficult to separate the data and the business processes and applications written to manage the data. In order to move this data and their corresponding applications to more efficient and modern data systems, including but not limited to distributed, cloud-based big data environments such as Hadoop™, Spark™ and R™, the source code for existing applications often has to be translated into a language compatible for execution in these target data systems. As such, large-scale data migration projects become costly, time-consuming, and expose the business to operational risks such as downtime. The manual identification and translation of applications written in SQL and Extract Transform and Load (ETL) code, and their existing analytical and reporting workloads, to a target language that can run within target environments is complicated, time-consuming, and error-prone. As such, the rebuilding all of these applications can be daunting and often leads to data migration projects failing because of the time and cost required for such source code translation.

Another level of complexity in data migration projects is that code written for the legacy source system often contain statements that call proprietary functions or utilities which are specific to and optimized for the legacy data warehouse but which are not compatible in the target data system (i.e. such statements are not recognized, directly translatable or executable). In a non-limiting example, proprietary database provider Teradata™ enables its users to send commands and/or queries to a Teradata™ database using the proprietary BTEQ utility which accepts input via BTEQ scripts that may comprise standard SQL statements and proprietary BTEQ statements invoking proprietary functions such as FLoad (fast load), MLoad (multi load), and FExport (fast export). While standard SQL statements (e.g. SELECT, INSERT, etc.) may be translated to corresponding ETL code in a target language (as disclosed in provisional patent application U.S. 62/813,489 filed on Mar. 4, 2019 by the current Applicant, the specification of which is incorporated herein by reference), statements that invoke proprietary functions and utilities may not be as easily translated. The reason for this difficulty is that these functions often operate as "black box" processes (i.e. the manner in which the command or utility operates is not disclosed to the user) which are optimized for the source database environment, and which often do not have ready equivalents in the target data environment.

Disclosed herein is a system and method, and more specifically, a source code interpreter framework, operable to automatically identify statements within source code that was developed for legacy data warehouse applications and wherein the related workloads invoke proprietary functions and utilities. The framework is operable to automatically output corresponding commands during runtime, which commands can be executed natively within the target data environment using features of the target system to obtain a corresponding computing result or functionality that is equivalent (i.e. that is similar but need not be exact) to the intended functionalities obtainable by executing the proprietary functions and utilities of the legacy data system. In other words, the intended object of the source code interpreter is to utilize one or more target system features that cover parts of the source system's functionality such that overall, the source language can be executed in target environment with as few changes as possible. It may be appreciated that the interpreter framework may be used alone or in conjunction with a base code translation framework described in the above-mentioned provisional application U.S. 62/813,489. For example, source code elements that cannot directly be translated by the based code translation framework to the target language may instead be interpreted by the code interpreter to invoke commands or operations in the target environment during runtime.

Figure 1:
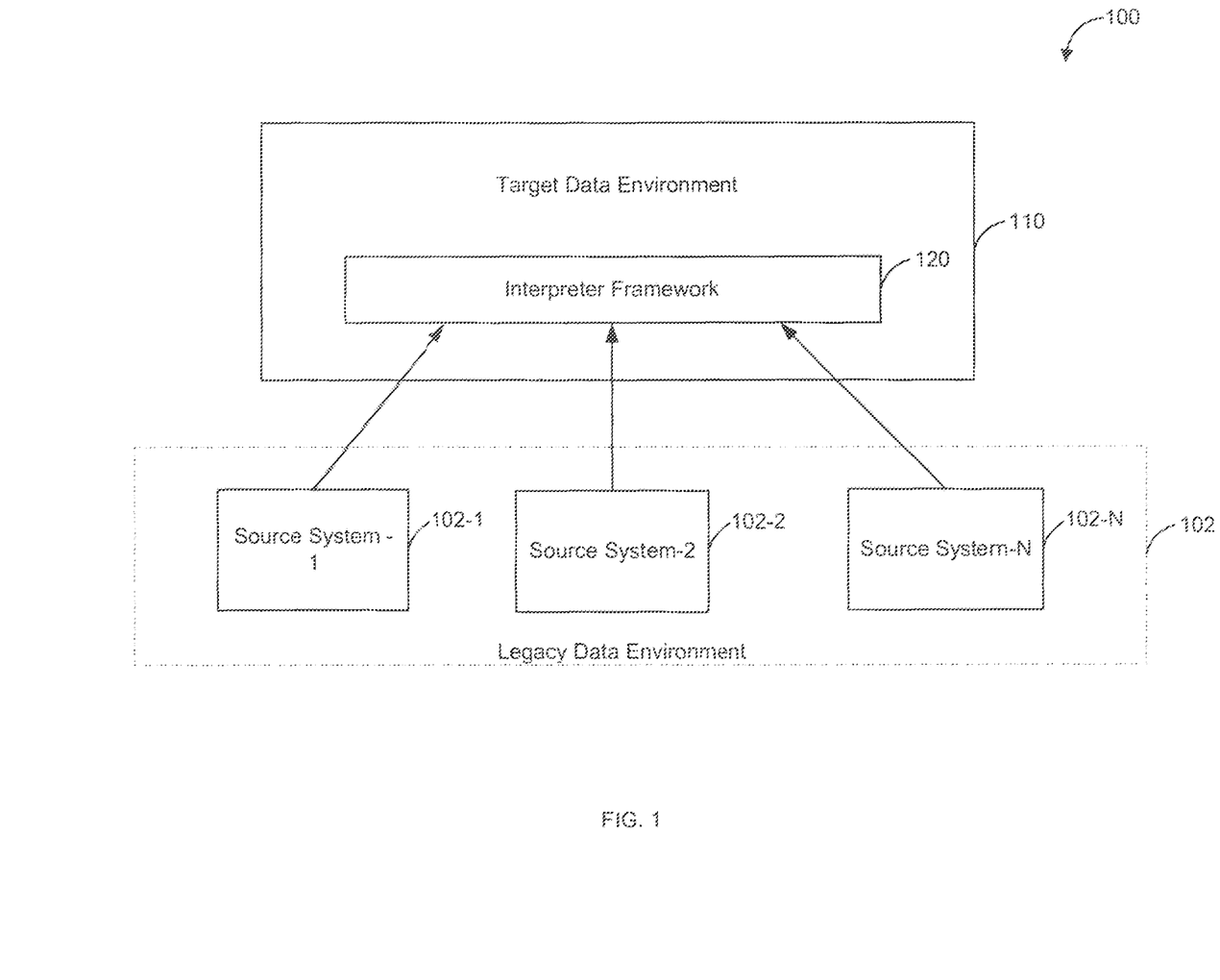
FIG. 1 is a block diagram of system architecture containing a source code interpreter framework operable to interpret source code in a source language according to one embodiment.

Referring first to FIG. 1, shown therein is a block diagram of a system 100 containing an interpreter framework 120 that can be used to interpret statements that invoke proprietary functions and utilities referenced in the application source code developed for use with a legacy data environment 102. The interpreter framework 120, as described in more detail subsequently, may then generate suitable commands for execution within a target data environment 110 to achieve corresponding functionalities. The legacy data environment 102 can contain a number of legacy data systems. Depicted in FIG. 1 are N source systems 102-1 to 102-N representing legacy source systems containing legacy repositories for storing data, associated applications, and associated reporting procedures and processes. For example, these legacy systems may be deployed using proprietary Teradata™, Netezza™ or Greenplum™ databases, in which the associated applications, reporting procedures and processes cannot run natively inside the target data environment 110.

During operation, existing source code written for the legacy source systems 102-1 to 102-N are imported into the interpreter framework 120 from the relevant data repositories (not shown). The source code is then parsed to identify translatable code and non-translatable code, the latter being targeted for processing by the interpreter framework during run-time to output corresponding run-time commands that can be executed natively within the target data environment 110.

Figure 2:
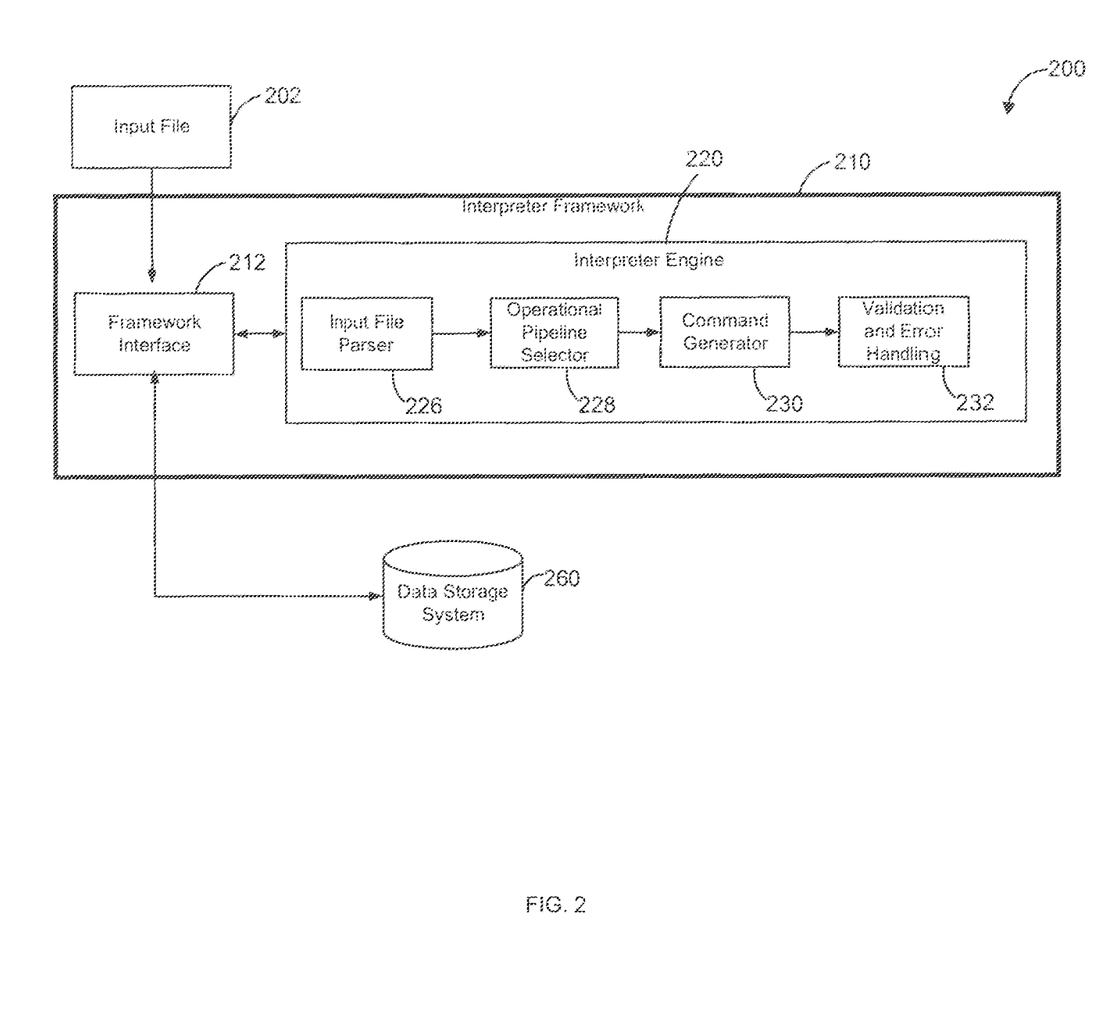
FIG. 2 is a block diagram depicting the architecture of the interpreter framework of FIG. 1.

FIG. 2 is a block diagram depicting an architecture 200 and a data flow of an interpreter framework 210 according to one embodiment. The interpreter framework 210 provides for run-time execution of data operations in the target data environment 110. The platform 200 can be hosted by an application server within the target data environment that is operable to communicate with a database engine within the same environment 110. In one non-limiting implementation, the legacy system contains a Teradata™ database with a corresponding set of ETL source code instructions that are written for this system, while the target data environment 110 implements a Snowflake™ data warehouse with support for common SQL. As noted previously, the source code written for the legacy system 102 can include statements that invoke proprietary functions or utilities that do not have an out-of-the-box equivalent in the target data environment 110. As such, these proprietary commands cannot directly be translated for execution in the target data environment 110. In these situations, the interpreter framework 120 is invoked to send SnowSQL commands to a Snowflake database engine within the target data environment 110 for execution at run-time to effect equivalent or corresponding computing results or functionalities in the Snowflake™ data warehouse to those that a Teradata™ database engine would provide by executing the proprietary functions or utilities in question.

The interpreter framework 210 includes a framework interface 212 to read input files 202 containing source code in the source language (the "source text") and to communicate with a database engine in the target data environment 110 to effect specific data operations. The framework interface 212 may further be configured to provide a graphical user interface ("GUI") or a command-line interface to enable a user to manage the operation of the framework, for instance by providing configuration settings and other operational parameters.

An interpreter engine 220 may be provided as an element within the interpreter framework 210 and is operable to carry out the process of source code interpretation. Each step of the interpretation process is illustrated within the interpreter engine 220 as a component module, as shown in FIG. 2. A description of each component is now presented.

An input file parser 226 is operable to parse the source text. The parsing can be performed using standard text parsing techniques to identify the logic and command statements contained within the source text. In some cases, the source text may be parsed by identifying special characters that indicate proprietary functions or utilities. For instance, in BTEQ scripts used in association with Teradata™ databases, non-standard and statements invoking proprietary functions and utilities are prefixed with a "." (period), while standard translatable statements such as SQL statements are not so prefixed. In such situations, the input file parser 226 can be configured to identify one or more lines of code corresponding to such proprietary functions and utilities, along with their associated input parameters defined within the source text.

The input file parser 226 can be further configured parse the input file to use a suitable grammar file format such as ANTLR4 compiled grammar .g4 files containing predefined grammars for a particular source language (e.g. Netezza™ and SAS™, etc.) or other grammar files known to those in the art. The parsing procedure generates an abstract syntax tree that breaks down the logic statements and commands statements within the input file. Source code statements that invoke proprietary utilities or functions, along with their associated input parameters defined within the source code, are thereby identified for interpretation.

Having determined the proprietary functions or utilities within the source text, the interpreter engine 220 invokes an operational pipeline selector 227 to select a suitable set of defined operations (the set of operations constituting a "pipeline") for each of the proprietary function or utility identified in the source text. The operations are specified as one or more commands that can be performed within target data environment 110, such as SQL commands or commands or functions that are proprietary to the target data environment 110. The execution of the chosen operational pipeline at run-time is intended to produce the same functionality, in the target data environment 110, that the corresponding legacy system would have obtained in the legacy data environment 102 by executing the identified proprietary function or utility.

The operational pipelines can be determined ahead of time and stored for use at run-time. For example, in the case of a BTEQ script for Teradata™ databases, operational pipelines can be created to correspond to proprietary statements that invoke data import/export jobs. For example, the BTEQ statement ".BEGIN LOADING" invokes a proprietary Teradata™ FastLoad job. Similarly, the BTEQ statement ".EXPORT" invokes a proprietary Teradata™ FastExport. These proprietary statements may not have a corresponding counterpart in another data environment. For instance, the Snowflake™ data warehouse does not provide a native file import/export operation compatible with or equivalent to the Teradata™ FastLoad or FastExport feature. To address this deficiency, one or more operations can be performed by a database engine (e.g. a processor executing a suitable database engine software) within the Snowflake™ environment to obtain the corresponding results. These operations can be grouped into an operational pipeline for use each time a command of this nature is encountered in the source text. Similar operational pipelines can be developed for other data environments such as Oracle™, IBM™ Hadoop™, Hive™ etc. A repository of operational pipelines can be stored within a data storage system 260 and accessed using the framework interface 212 as required by the interpreter engine 220.

A command generator module 230 outputs the commands for execution within the target data environment 110. For example, the commands and associated parameters are transmitted to the relevant database engine so that the appropriate data operations are performed (e.g. create tables, import data, export data, write files, etc.). The commands that are outputted are derivable based on the operations defined within the operational pipeline and the associated parameters (e.g., data field names, table names, column names, etc.) can be obtained from the parsed source text.

A pipeline execution, validation and error-handling module 232 is operable to validate data being imported. For example, an error table is established to record write errors corresponding to data records that were not written to the target database. A write error may occur, for example, where there is a mismatch in the data fields of a given record in the input data and the corresponding data table columns of the target database where the record is to be stored. The module may also function to record instances of duplicate records such that a second error table may be established to record instances of duplicate records identified in the input data.

A description of a source text parsing procedure, to identify statements that invoke proprietary functions or utilities, is now presented. For explanatory purposes, the example source text uses Teradata™ BTEQ script language. It is understood that other types of source code can be parsed using techniques disclosed herein or other methods known to those skilled in the art.

Figure 3:
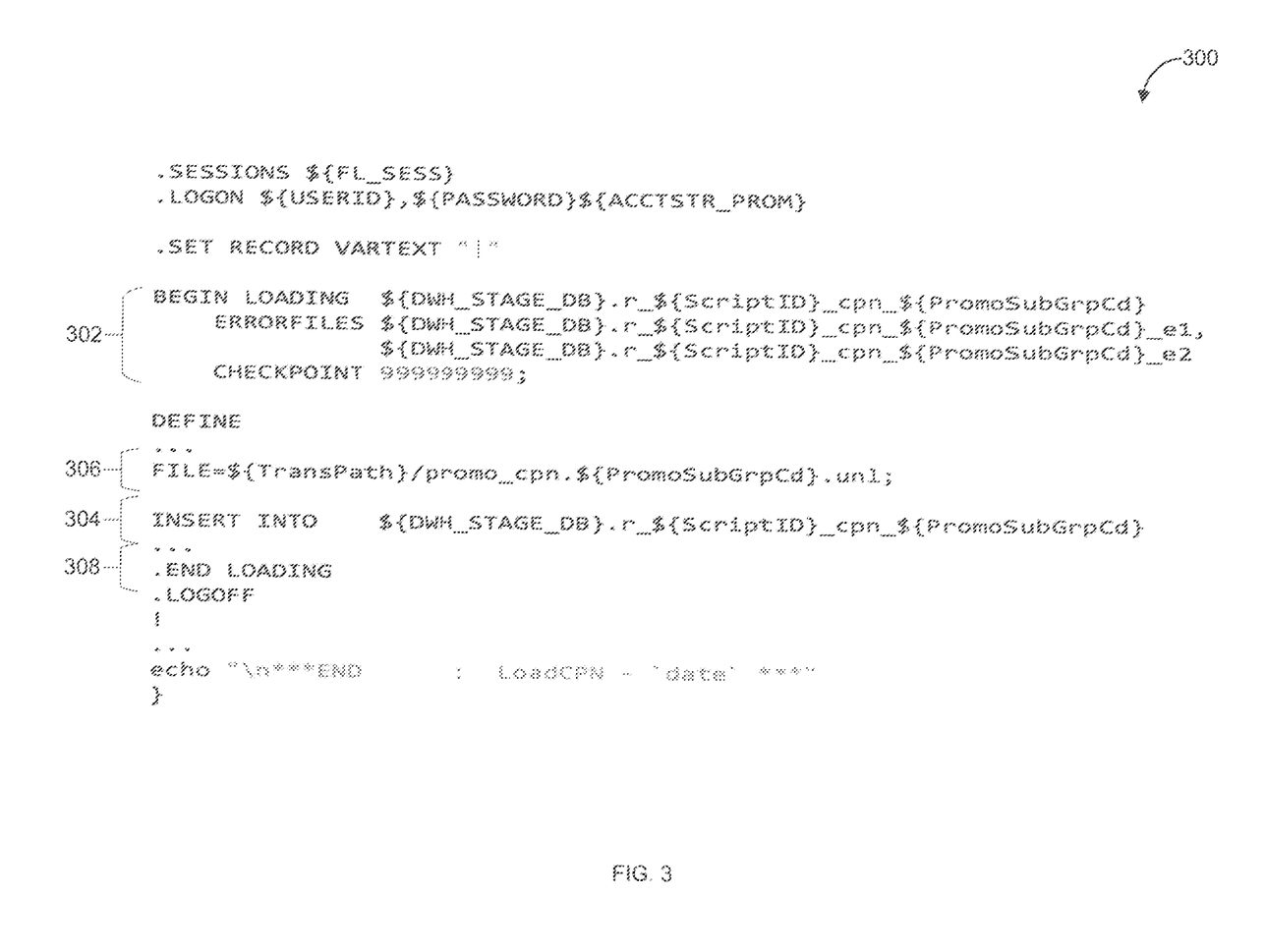
FIG. 3 is an example block of source code in a source language containing proprietary statements.

Shown in FIG. 3 is an example source code 300 written in the BTEQ scripting language containing Teradata™ SQL and proprietary BTEQ statements for loading data from a data file. As noted previously, commands and functions specific to BTEQ may be prefixed with a "." (period). A first code block 302 is the statement "BEGIN LOADING" that invokes a proprietary BTEQ command to start a Teradata™ FastLoad job, and specifies a target table, two error tables (each ending in "e1" and "e2"), and a checkpoint to be taken every 999999999 records. The error tables can be used to store error records corresponding to errors encountered in the data loading process. A second code block 304 is a Teradata™ SQL statement that sends input data records from an input file (specified in the code block 306) to the target table in a Teradata™ database. Code block 308 corresponds to a proprietary BTEQ statement to terminate the FlastLoad job.

In a data migration project, it may be appreciated that a particular data processing script contains code elements that may be directly translated to source code executable in the target data environment 110 and those that cannot. For instance, if the target data environment is the Snowflake™ data warehouse, the Teradata™ SQL command of block 304 may be directly translated into a Snowflake™ SnowSQL statement. However, the BTEQ statement invoking the Fast-Load job (i.e. code block 302) would not have a corresponding Snowflake™ equivalent. Accordingly, the input file parser 226 identifies the existence of such proprietary statements for further processing within interpreter engine 220, for example, to determine a suitable operational pipeline to generate appropriate commands for execution within the target data environment 110.

Operational Pipelines

As noted above, operational pipelines may be used to specify one or more commands (i.e. steps) executable within the target data environment 110 to achieve an equivalent computing result or functionality obtainable by invoking a given proprietary function in the legacy system. The type of commands specified within the pipeline may be dependent on the nature of the proprietary statement. Examples shown with respect to FIGS. 4 to 6 are presented using BTEQ source code for the Teradata™ environment. However, it would be understood that source code for other data environments could similarly be used.

Figure 4A:
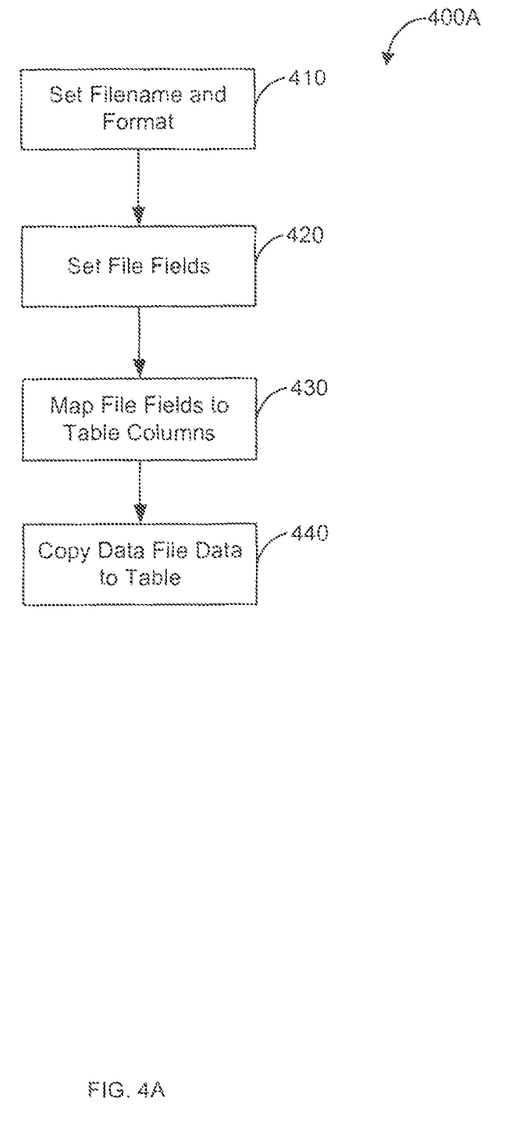
FIGS. 4A to 4D (collectively, FIG. 4) depict exemplary source code blocks with proprietary data import statements and their corresponding operational pipelines.

FIG. 4A shows a pipeline 400A that can be used for the importation of data from a source data file into a destination data table of a database in the target data environment. For example, if a source text statement that invokes a proprietary data importation function is identified, pipeline 400A may be selected by the operational pipeline selector 228 and the corresponding commands may be transmitted by the command generator 230 for execution at the target data environment to import data from a data file. Each step in the pipeline can be associated with or be "mapped" to one or more lines of code in the source text (described with respect to FIGS. 4B to 4D below), to generate the equivalent functionalities represented by that corresponding code.

Step 410 determines, from the source text, the file name and file format of the data file that contains the data records for importation. Next, step 420 determines data fields of the data file records so that a mapping can be determined between the data fields and the table columns of the destination database table (the name of the table can be specified in the source text) at step 430. Step 440 invokes the associated database engine operations to copy the data file data to the destination database table. Based on these pipeline steps, corresponding commands recognized in the target data environment 110 are outputted by the command generator module 230 and transmitted to the database engine for execution. For example, the import operation of the pipeline may specify a Snowflake™ SQL COPY INTO command. Parameters such as the source file name or target table name, which were acquired from reading the source text, can be transmitted along with the commands.

Figure 4B:
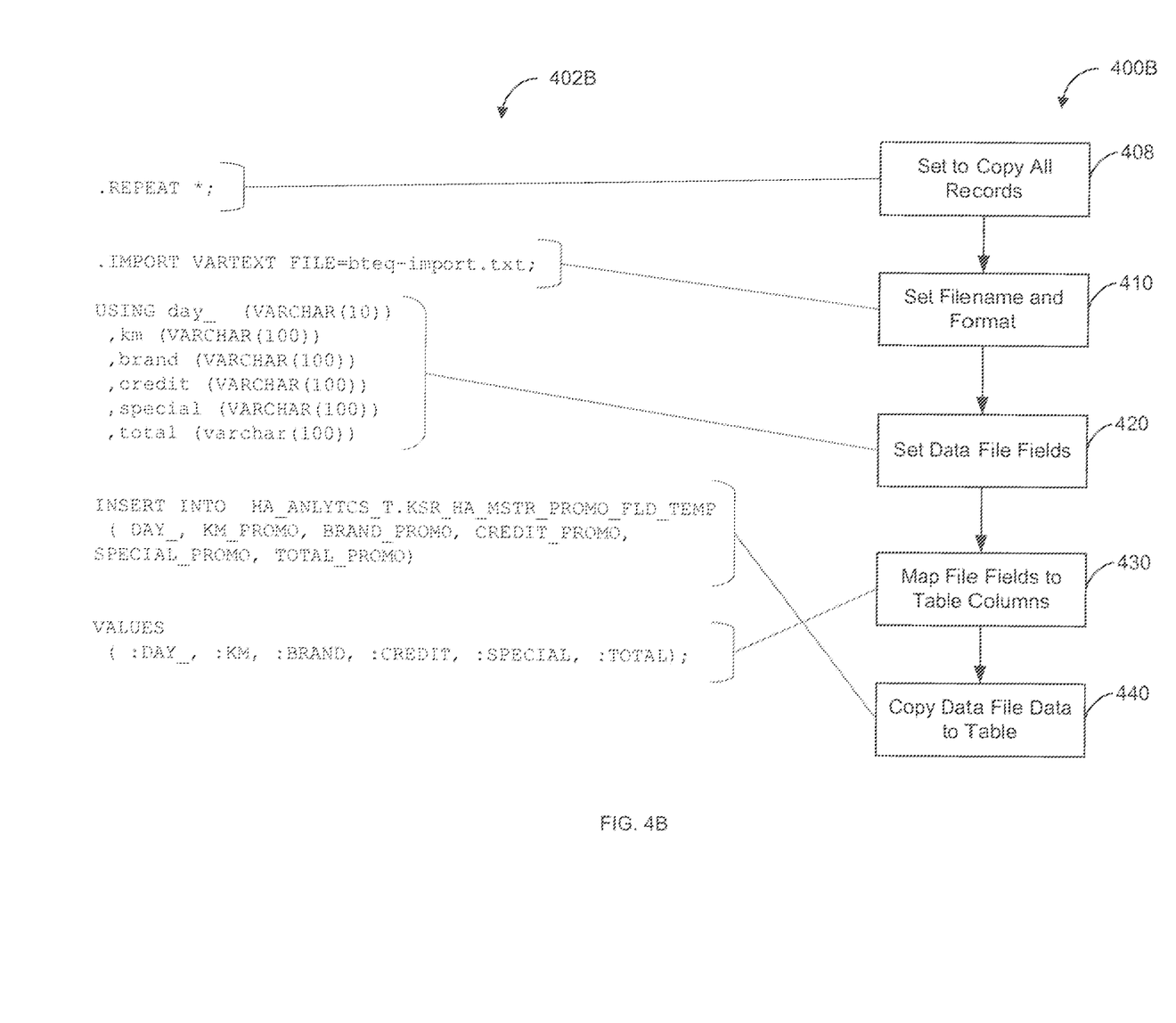

Variants of the pipeline 400A of FIG. 4A may be defined to accommodate for specific characteristics of a proprietary command. As shown in FIG. 4B, a pipeline 400B is provided to obtain an equivalent computing result or functionality as the indicated BTEQ statements 402B to import data from a file called "bteq-import.txt". Pipeline 400B is substantially the same as pipeline 400A except with an additional step 408 to instruct the database engine to repeat the importation steps until all records have been copied. The correspondence between the relevant steps in pipeline 400B and the respective BTEQ statements that each pipeline step is intended to emulate are indicated using the solid lines. It may be observed from the example of FIG. 4A that the order in which the BTEQ statements appear do not necessarily dictate the order of steps in in the corresponding pipeline. In the current example, the mapping step 430 appears before the copying step 440 in pipeline 400B while the corresponding order of the BTEQ statements are reversed. Accordingly, the pipeline steps may be arranged to better suit the target data environment, which can result in improved system performance.

Figure 4C:
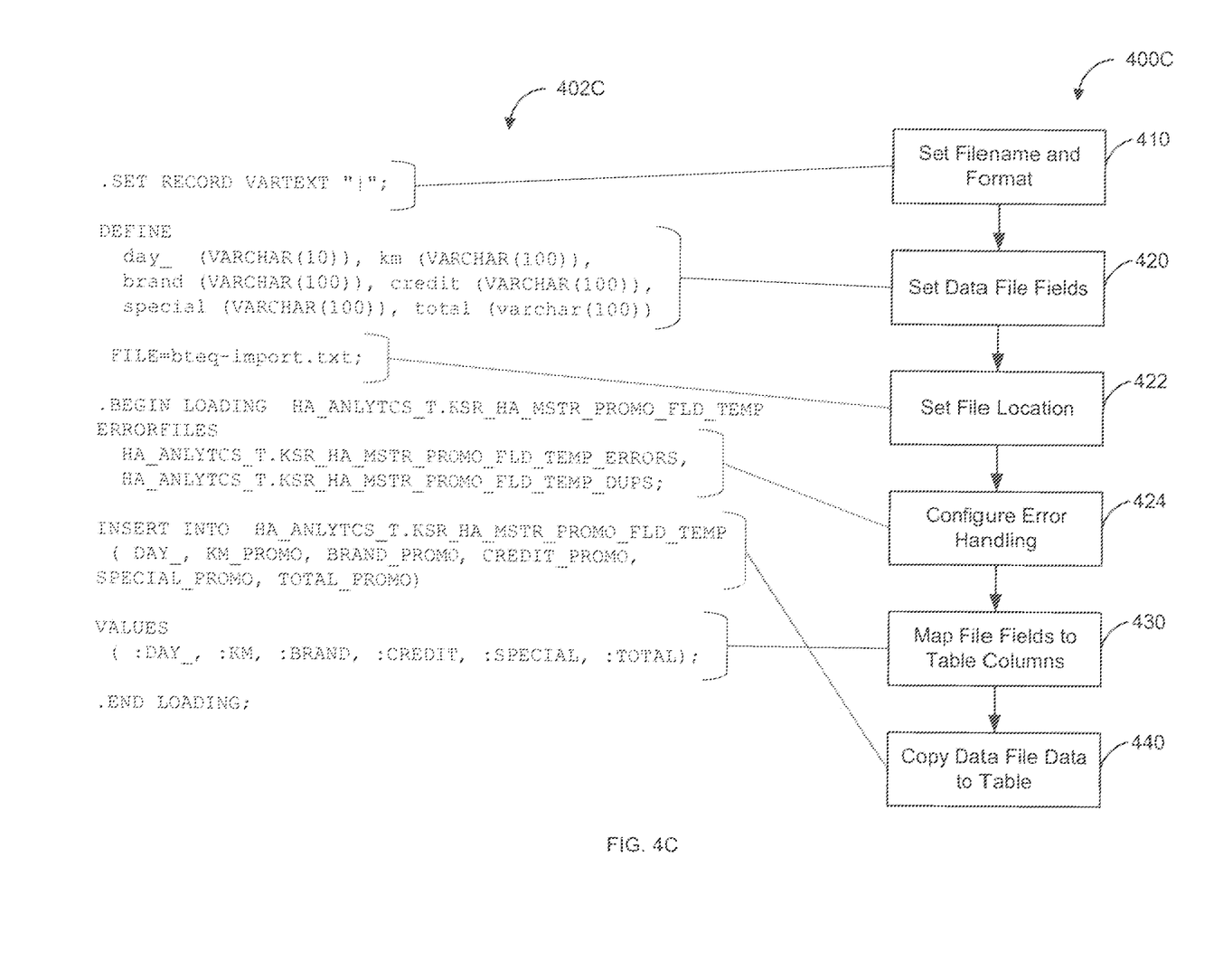
Figure 4D:
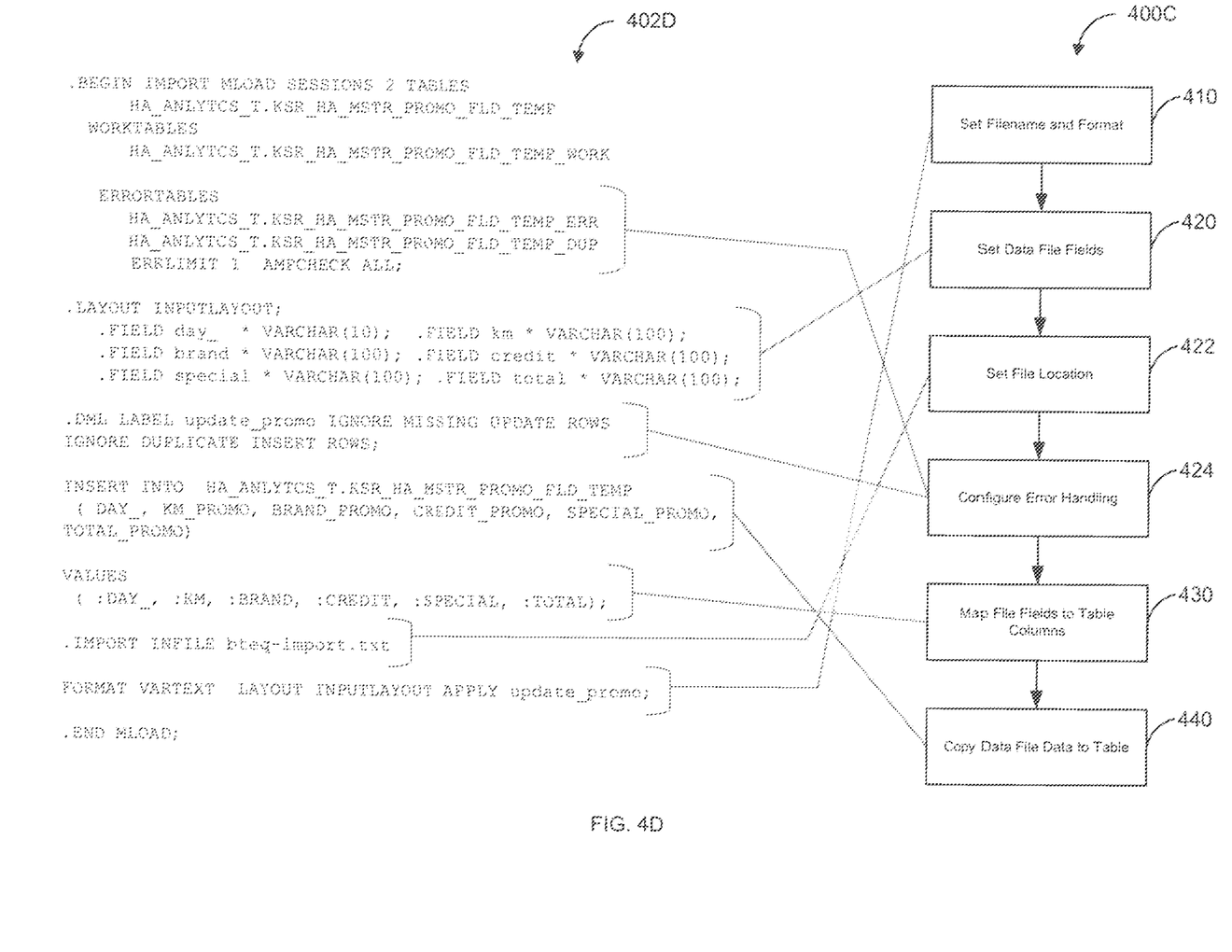

FIG. 4C shows pipeline 400C, another variant of the generalized pipeline 400A of FIG. 4A for use with the BTEQ import statement that invokes a FastLoad job (indicated by the statement ".BEGIN LOADING"). In the present example, two additional intermediate steps are introduced. Step 422 specifies the location of the source data file and step 424 sets out additional procedures for error handling (described in detail subsequently). FIG. 4D shows that the same pipeline 400C can be used to handle a proprietary BTEQ MultiLoad import command in the Teradata™ environment (indicated by the statement ".BEGIN IMPORT MLOAD"). Accordingly, if the input file parser 226 identifies BTEQ statements corresponding to a FastLoad or MultiLoad command, the operational pipeline selector may thus select pipeline 400C for use by the command generator 230.

Figure 5A:
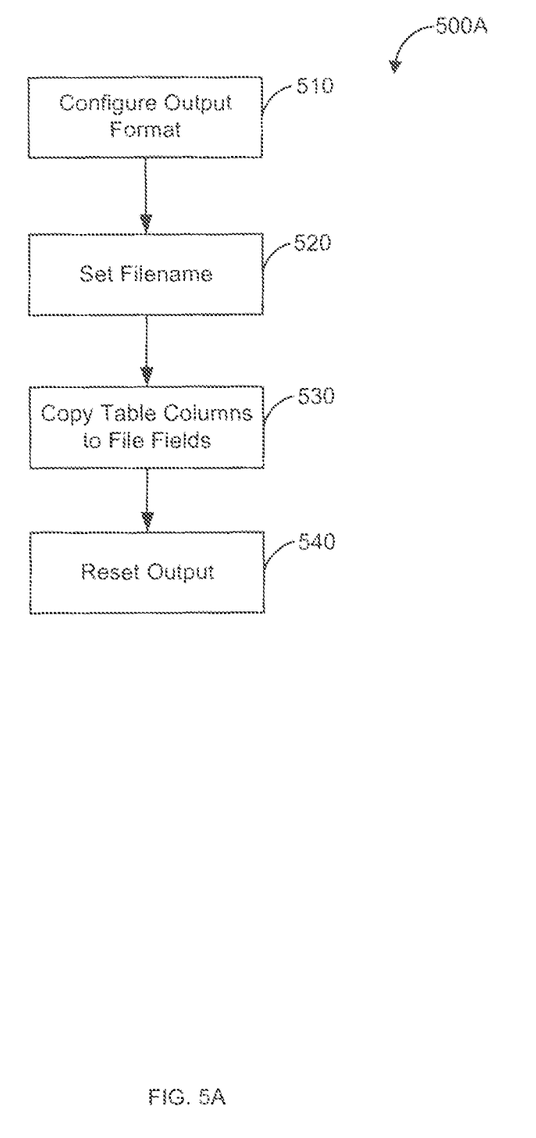
FIGS. 5A to 5C (collectively, FIG. 5) depict exemplary source code blocks with proprietary data export statements and their corresponding operational pipelines.
Figure 6:
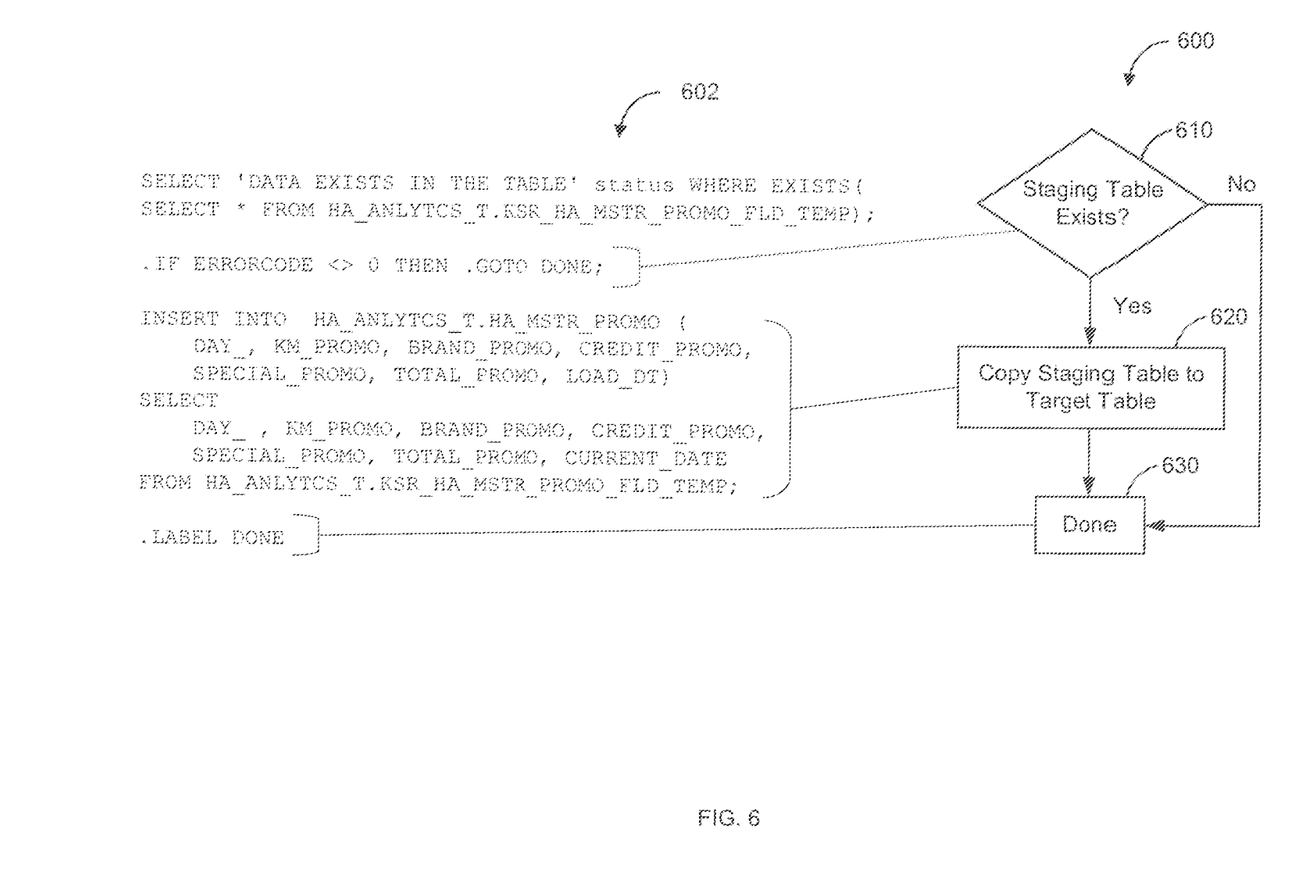
FIG. 6 depicts an exemplary source code block with a proprietary conditional statement and its corresponding operational pipeline.

FIG. 5A shows a data export pipeline 500A that can be used for exporting data from a source database table to a destination data file. This pipeline can be selected if the input file parser identifies a proprietary command statement that invokes a data export operation. The BTEQ export statements include formatting parameters that control the manner in which the outputted data is presented, such as whether the "|" (vertical slash) character is to be used as separators. Accordingly, step 510 determines the desired output file format specified in the BTEQ source text. This information is identified within Step 510 and the same output style may be configured for output using the database engine of the target data environment 110. Step 520 sets the output data file name according to the source text. Step 530 invokes a suitable data copy operation to copy the data records from a database table to the destination data file. The copy operation copies the data in each table column to corresponding data record fields in the data file. Step 540 resets the output to terminate the data file writing operation.

Figure 5B:
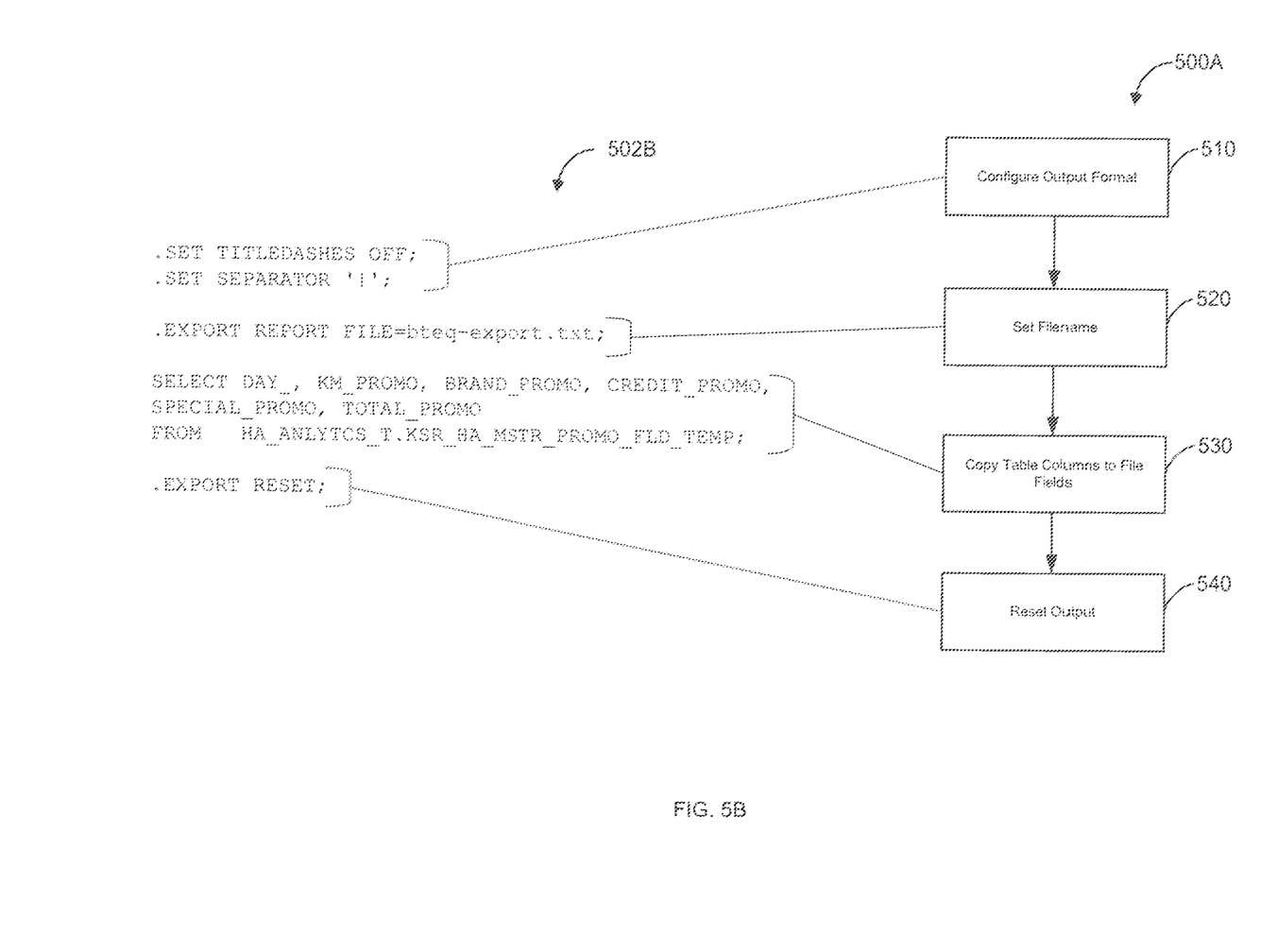
Figure 5C:
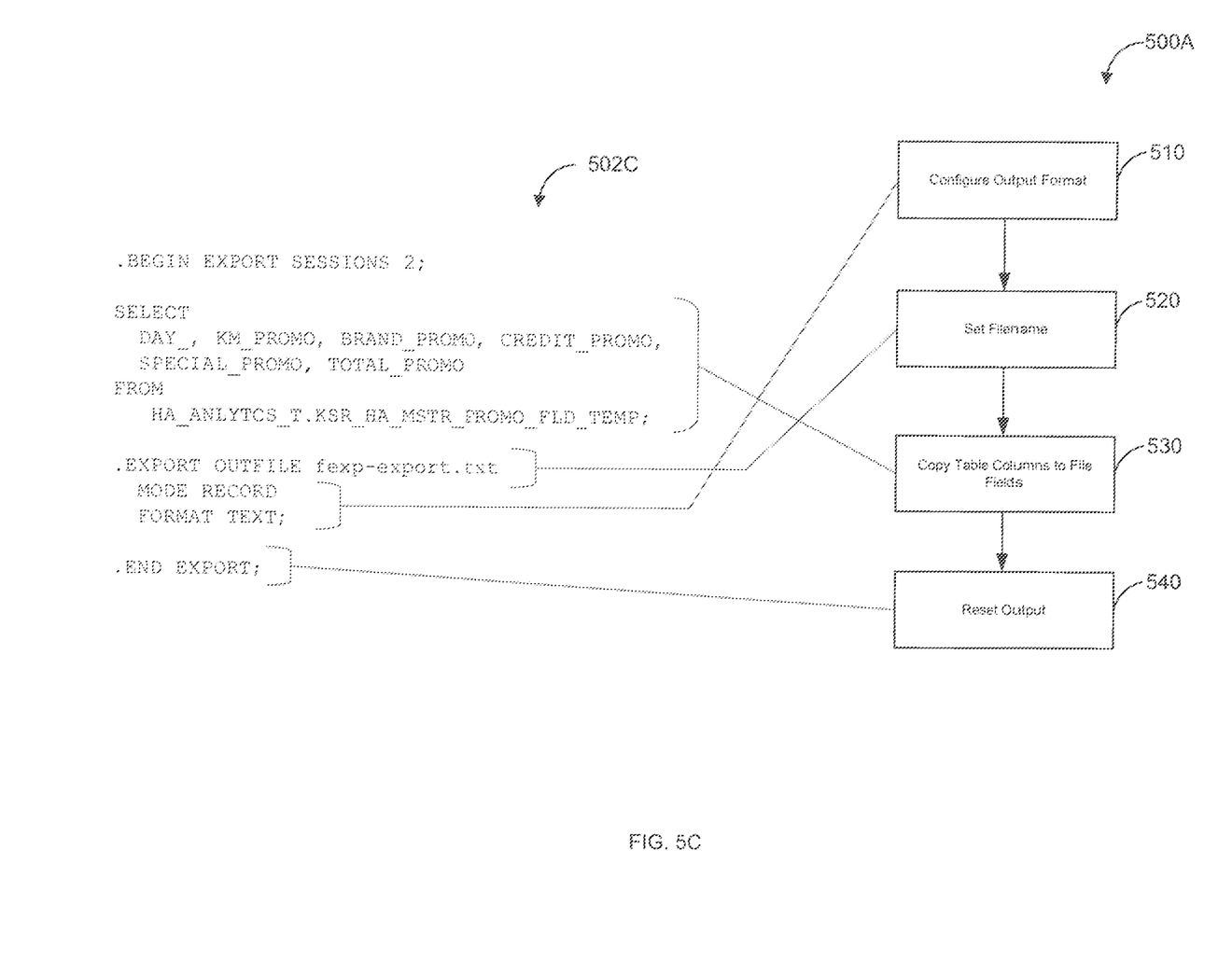

FIG. 5B, shows an example use of the data export pipeline 500A with BTEQ source text 502B to export data from a source database table to a destination file called "bteq-export.txt". FIG. 5B also shows a correspondence, indicated using the solid lines, between the steps of pipeline 500A and the respective statements in the BTEQ source text 502B. FIG. 5C shows an example use of the data export pipeline 500A with another proprietary BTEQ export statement that invokes a FastExport data export job within the Teradata™ environment (indicated by the statement ".BEGIN EXPORT SESSIONS 2"). In this example, it is also noted that the order in which the BTEQ statements appear do not necessarily dictate the order of steps within the pipeline.

FIG. 6 shows an example pipeline 600 for use in association with proprietary conditional statements contained in the BTEQ source text block 602. More specifically, a proprietary conditional statement recited as ".IF ERRORCODE< >0 THEN.GOTO DONE;" is a BTEQ statement indicating that an error code other than zero "0" causes the BTEQ processor to jump (using the BTEQ "GOTO" command) to a point in the code block 602 labeled "DONE" (indicated by the last line of code ".LABEL DONE"). Otherwise, certain code statements that are present before the referenced point "DONE" are assessed.

In the present example, the conditional statement determines the existence of a staging table (a table for temporarily storing data, as indicated by the first two lines of the code in the source text block 602 beginning with the word "SELECT") and is represented by pipeline decision step 610. If the staging table does not exist (i.e. ERRORCODE< >0 is true) then decision step 610 proceeds to "NO", in which the pipeline 600 jumps to step 630 "Done" and terminates. Otherwise, decision step 610 proceeds to "Yes" (i.e. ERRORCODE< >0 is false) to execute corresponding actions to copy data from the staging table to the target table at step 620 before proceeding to step 630 "Done". The correspondence between the source code in source text block 602 and the steps of the pipeline 600 are represented by the solid lines.

Figure 7:
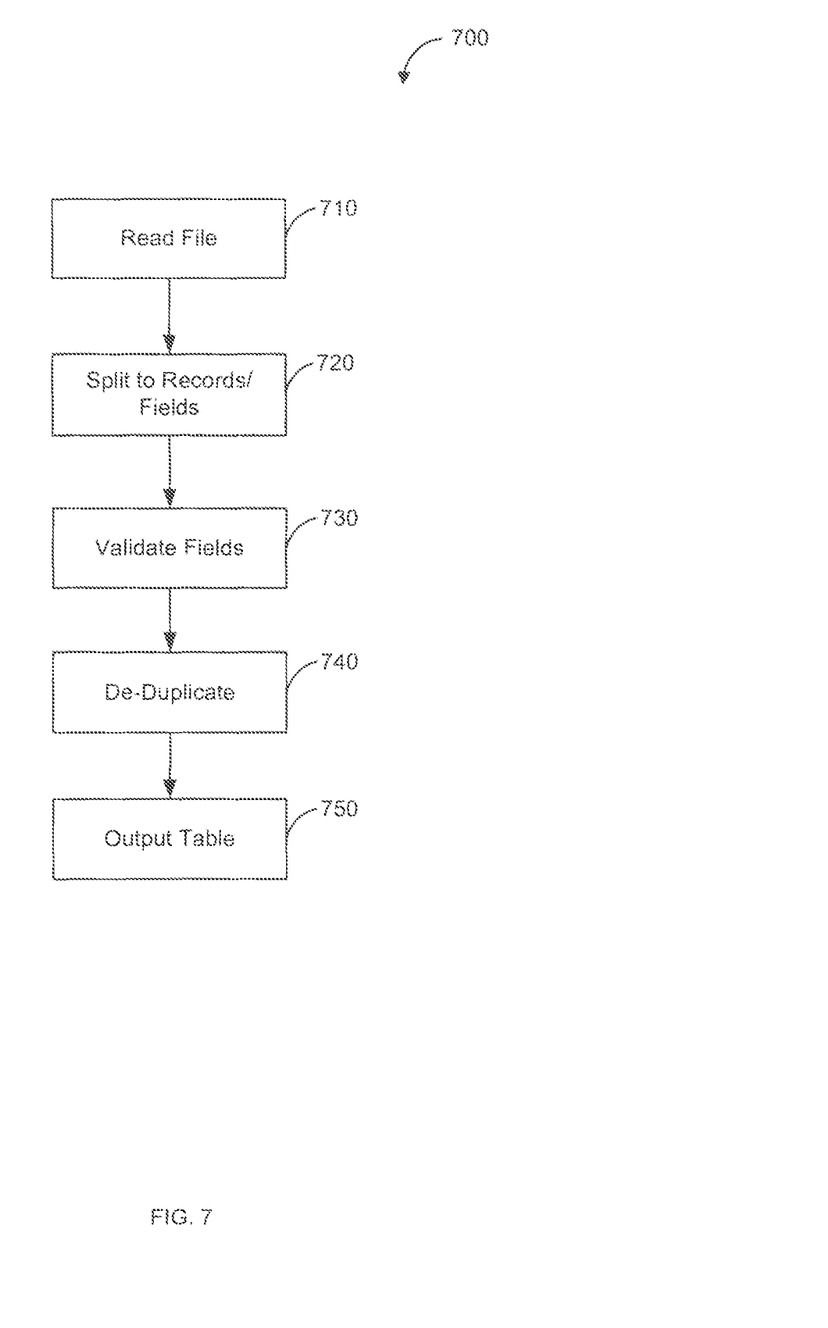
FIG. 7 is a flowchart of a process for carrying out validation and error handling using a validation and error handling module of the interpreter framework of FIG. 2.

FIG. 7 depicts a process flow 700 for carrying out validation and error handling by the pipeline execution, validation and error-handling module 232 of FIG. 2. This module can be invoked, for example in the performance of certain procedures where error handling may be required, such as procedures involving importation of data from an input file to a destination database table. The pipeline execution, validation and error-handling module 232 may send the necessary commands to the database engine in the target data environment 101 to perform tasks relevant to validation and error handling.

The pipeline execution, validation and error-handling module 232 may be invoked where the proprietary source text statements reference error-handling functions, such as at step 424 of FIGS. 4C and 4D in association with Teradata™ FastLoad and MultiLoad jobs. Validation and error handling procedures may be used to flag data records that are not imported (i.e. the record would be skipped). For example, inconsistencies such as mismatches between the data fields of a given data record and the corresponding table columns in the destination database may prevent the data record from being imported. In another instance, importation of a data record would skipped if it is determined that it the record is a duplicate of another record.

The process starts at step 710, in which the pipeline execution, validation and error handling module 232 reads the data file for processing. At step 720, the data is split up into separate records and their data fields. If an error occurs at this stage, the process may terminate and an error result may be outputted. The purpose of this step is to emulate the operation of the Teradata™ BTEQ utility but within in the target environment, i.e. Snowflake™. This way, the impact of any changes resulting from migrating to the target environment is limited to the BTEQ script itself and does not require changes to any in- or outbound data feeds. The data fields of the data file records are validated at step 730 against the corresponding table columns in the target database. The table information may be obtained by way of reading the appropriate table metadata stored in the destination database. If an error is identified, such as a mismatch in the record fields relative to the table columns, the error is recorded into an error table (e.g. "Error Table 1") This validation step mimics a Teradata™ import operation. Field validation ensures input data are correct, i.e. date values are coded in such a way that the value can be decoded by the Teradata™ BTEQ utility. In some cases, the target system may not be able to accept these values directly. As such, a separate data converter may be provided in the disclosed architecture as a part of the import pipeline. Error tables are error handling elements used in the Teradata™ environment and they are also mimicked in the process. For example, "Error Table 1" is established to receive field validation errors. For instance, a field containing the date 2019 Feb. 29 would go there as invalid date. Records for which their corresponding validation fails may be withheld from being copied to the destination data table. At step 740, the data records of the data file are analyzed to identify instances of duplicate copies of the same record and such duplicates are deleted from the data set. The identified instances of duplicate data are written into the same error table or into another error table (e.g. "Error Table 2"). For example, if the input file has two rows that are not identical but have the same primary key value, then one of those rows will be stored in Error Table 2 (to flag a possible duplicate error). Upon completion of the data field valuation and de-duplication procedures at steps 730 and 740, the data in the data file is populated to the target database table at step 750.

In some implementations, the interpreter engine 220 may incorporate target-specific optimizations to improve operational efficiencies. As noted above, the command generator module 230 is operable to transmit commands such as SQL commands to the database engine to perform specific data operation tasks to obtain the equivalent result in the target data environment 110 as those obtainable using the proprietary command statements in the legacy data environment. As a non-limiting example, Table 1 shows example optimizations that may be implemented between Teradata™ statements and corresponding commands intended for a target Snowflake™ database environment.

TABLE 1

Source code executions between source and target environments

| | Source Text Statement | Execution Command(s) in Target Environment |
|---|---|---|
| 1 | INSERT INTO . . . | COPY INTO . . . |
| 2 | INSERT INTO (. . .) VALUES (. . . , GET_DATE) | SELECT GET_DATE INSERT INTO ( ) VALUES (. . .) |
| 3 | UPDATE . . . | INSERT INTO WORK_TABLE MERGE INTO . . . USING WORK_TABLE . . . |
| 4 | INSERT INTO . . . | INSERT INTO WORK_TABLE MERGE INTO . . . USING WORK_TABLE . . . |

In the first example (row 1, Table 1) an INSERT INTO statement in the source text is transmitted to the target environment as a corresponding COPY INTO command. Next, in the second example (row 2, Table 1), a single SQL "INSERT" statement in the source text is implemented as two operations in the target environment. This is an example of non-indepotent expressions that may be evaluated once per run. In the third and fourth examples (rows 3 and 4, Table 1), the source text statements correspond to "upsert" operations (i.e. inserting rows into a database table or updating them if the rows exist). The corresponding operations in the target environment are implemented as two operations carried out by the database engine and further involves the creation of a temporary data table called "WORKING TABLE". More specifically, the initial data is imported to the temporary table and subsequently merged into the target data table.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

The invention claimed is:

1. A computer-implemented method to interpret source code corresponding to a source language that is executable in a source computing system for use in a target computing system, the method comprising:

creating one or more operational pipelines specifying at least one command executable by the target computing system;

parsing the source code to identify a proprietary statement, the proprietary statement executable by the source computing system to invoke at least one of a data import computing task and a data export computing task in the source computing system, the proprietary statement not executable by the target computing system;

selecting, for the proprietary statement, a corresponding operational pipeline before run-time of the target computing system; and transmitting the at least one command specified by the selected operational pipeline and associated parameters to the target computing system, wherein execution of the of the at least one command causes the target computing system to perform computing tasks that correspond to respective computing tasks performed by the source computing system when the source computing system executes the proprietary statement.

2. The computer-implemented method of claim 1, wherein the step of transmitting the at least one command and associated parameters to the target computing system is performed during run-time of the target computing system.

3. The computer-implemented method of claim 1, wherein the associated parameters are obtainable from the source code.

4. A source code interpreter system in a target computing system for interpreting source code corresponding to a source language that is executable in a source computing system, the source code interpreter system storing instructions that when executed by a processor cause the source code interpreter system to perform operations comprising:

parsing the source code to identify a proprietary statement, the proprietary statement executable by the source computing system to invoke at least one of a data import computing task and a data export computing task in the source computing system, the proprietary statement not executable by target computing system;

selecting, from one or more operational pipelines created to specify at least one command executable by the target computing system, a corresponding operational pipeline for the proprietary statement before run-time of the target computing system; and transmitting the at least one command specified by the selected operational pipeline and associated parameters to the target computing system, wherein execution of the at least one command causes the target computing system to perform computing tasks that correspond to respective computing tasks performed by the source computing system when the source computing system executes the proprietary statement.

5. The system of claim 4, wherein the at least one command and associated parameters are transmitted to the target computing system during run-time of the target computing system.

6. The system of claim 4, wherein the associated parameters are obtainable from the source code.

* * * * *